Sept. 12, 1939.  J. PODOLSKY  2,172,592

WASHER

Filed Nov. 6, 1935

Inventor
Jacob Podolsky
by David Rines
Attorney

Patented Sept. 12, 1939

2,172,592

UNITED STATES PATENT OFFICE 2,172,592

WASHER

Jacob Podolsky, Dorchester, Mass.

Application November 6, 1935, Serial No. 48,511

8 Claims. (Cl. 251—161)

The present invention relates to washers and, though having fields of more general utility, is more particularly related to faucet or valve washers, especially those for hot-water faucets. The present application is a continuation in part of application Serial No. 647,773, filed December 17, 1932.

Washers of the above-described character are usually made of a relatively soft or yielding material, such as rubber that, because of the very fact of its softness, disintegrates readily under the severe conditions of use to which the washers are subjected. The head of the screw that holds the washer to the stem exerts a constant pressure against the washer that tends to rupture it. Every time that the faucet handle is turned, furthermore, to shut off the water, the washer is abraded by the valve seat and further compressed and the material thereof, therefore, forced out of shape and spread outward. If the water is hot, the decomposition of the fibres of the washer proceeds at a very rapid rate; and if it is cold, the only difference is that the process of breaking up takes a little longer time.

An object of the invention is to improve upon washers of the above-described character, to the ends that their disintegration may be prevented, their life increased, and their efficiency improved.

Figure 1:
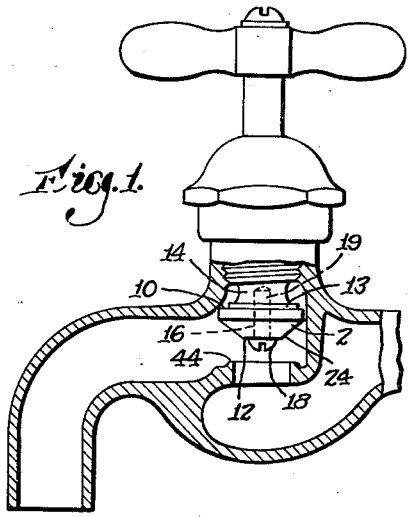
Figure 3:
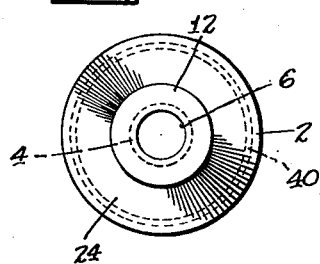
Figure 2:
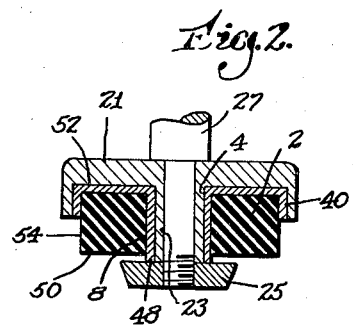
Figure 4:
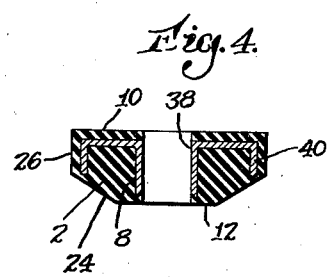
Figure 5:
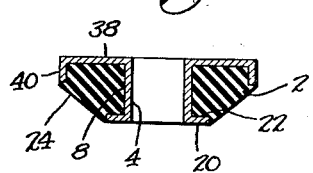
Figure 6:
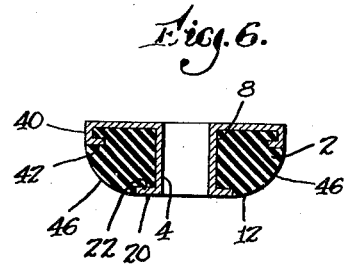

The invention will be explained more fully in connection with the accompanying drawing, in which Fig. 1 is an elevation, partly in longitudinal section, of a faucet, showing a washer in place thereon; Fig. 2 is a similar view, upon a larger scale, of a modification, showing the invention applied to other uses than faucets; Fig. 3 is a plan of a preferred washer; Fig. 4 is a longitudinal section of the same; and Figs. 5 and 6 are similar sections of modifications.

The improved washer of the present invention comprises a ring element 2 constituted of relatively soft material such as rubber, fibre, composition and the like, and a reinforcing cylindrical or sleeve member 4, constituted of relatively hard material, like a relatively hard metal, such as brass, disposed in the opening 6 of the ring element 2, in contact with the wall of the opening 6. Preferably, but not necessarily, from some aspects of the invention, the outer wall of the cylinder or sleeve 4 is intimately united to the said wall throughout the area of contact between the said wall and the said cylindrical member 4. This intimate union is illustrated at 8, and may be effected in any desired way as, for example, in the case of rubber, by vulcanizing the rubber to the metal. The rubber is thus reinforced by the metal.

The ring member 2 of the washer is provided with a relatively large, substantially flat, circular face 10 and a relatively small, substantially flat, circular face 12 opposite thereto. The faces 12 and 10 are preferably connected by a tapering surface, shown as a frustum of a cone 24. This frustum of the cone 24 may extend to the larger face 10, but it is generally preferred to have it merge in a cylindrical wall 26 adjacent to the larger face 10 and of the same diameter therewith. The tapering surface may, however, be curved, if desired, as illustrated at 46, in Fig. 6, and it may also have other shapes. It is within the spirit of the present invention, indeed, to employ flat washers, as illustrated in Fig. 2, having equal flat circular faces 50 and 52 bounded by a cylindrical surface 54.

The relatively large face 10 is adapted to rest in contact or engage with a substantially flat face 13 at the lower end of a rotatable faucet, valve stem 14, the washer being held in place by a screw or bolt 16, the head 18 of which is adapted to engage against the smaller face 12 of the ring element. As the screw is threaded tightly into a vertically disposed threaded opening 19 in the stem 14, the head 18 of the screw places tremendous pressure against the ring element 2, causing it to become weakened under the strain. The metal sleeve 4 reenforces the rubber of the ring element 2, relieving it of this strain. The thickness of the sleeve 4 should be sufficiently great to prevent crushing of the rubber 2 when the screw 16 is tightened. Preferably, in many cases, the thickness of the sleeve 4 is substantially the same as that of the ring element 2, as illustrated, so that one end of the metal of the cylinder 4 extends out to the smaller face 12 so as to be flush therewith, as shown, in order that it may be engaged by the head 18 of the screw 16. The sleeve 4 may, however, be caused to extend slightly beyond the rubber of the washer, as shown at 48, in Fig. 2. On the other hand, the wall 4 may be considerably shorter than the thickness of the rubber, so as to leave the rubber 2 unreinforced near the face 12.

As the other end of the metal engages against the face 13, all, or practically all, the strain of the screw pressure will be exerted against the metal 4 and none, or relatively little, against the rubber 2. The sleeve 4 thus reinforces the rubber 2 to relieve it of the strain of the pressure exerted thereon by the said head 18 of the screw or bolt 16. The thickness of the metal sleeve 4 may, however, be less than the thickness of the rubber 2, though it should be sufficiently great to provide a suitable backing for the screw head 18. To increase the backing rest or support, the said end of the sleeve may be provided with a peripheral flange 20. The flange 20 may be set into a recess 22 in the face 12, as illustrated in Figs. 5 and 6. The flange may be of diameter almost, or quite, equal to the diameter of the smaller face 12, as illustrated, or of smaller diameter.

The invention may, however, be used in other relations than for faucets. As illustrated in Fig. 2, for example, the novel washer of the present invention may be inserted in a cup-shaped or other washer holder 21 having a sleeve 23 that is adapted to be inserted into the sleeve 4, instead of the screw 16 of Fig. 1. The washer may then be held in place by a nut 25 threaded upon a valve or other stem 27 that is mounted in the sleeve 23. In other cases, indeed, the stem 27 may be inserted directly into the sleeve 4, without the interposition of the sleeve 23 and without using the holder 21; and instead of using a nut 25, the stem 27 may be headed or riveted over, or otherwise designed, to hold the washer permanently on the stem 27, for the washer of the present invention has so much longer a life than prior washers that it may be permanently joined to the stem 27 and discarded with the stem 27 when a new washer and stem are needed.

At the time that the exposed, rubber, conical, surface portion 24 is caused to engage the valve seat 44, it is not under the strains to which washers of the prior art are subjected, because the screw or bolt 16 does not distort the rubber 2, and so it can withstand more readily the forces to which it is subjected in use. More than that, it is possible, with the present invention, to use a more flexible rubber 2, so as to have a soft seating surface, yet without producing hammering. The result is a washer that closes more easily, operates more efficiently and lasts longer.

Continued turning of the valve stem to force the washer against the valve seat 44, however, will abrade the rubber or other soft material 2, and will force it peripherally outward, thus not causing the seat 44 to cut an annular groove in the rubber 2, but causing the rubber on the outer side of this groove to curl or spread away from the body of the rubber. This will shorten the life of the washer.

According to the present invention, this is prevented by disposing the rubber in an annular cup-shaped member. The cup is formed between the sleeve part 4 and a sleeve part 40 as sides and a flange 38 as the bottom. Because of the relatively small diameter,—usually less than an inch,—of washers of this type, and because of the substantial thickness,—usually one-third to two-thirds,—compared to the diameter of these washers, the side 40, which may be about one-half the thickness of the washer, holds the rubber 2 securely against the said outward curling or spreading tendency, notwithstanding that the rubber 2 extends beyond the free end of the outer sleeve-member part 40. If the diameter were exceedingly large compared to the thickness of the washer, the curling or spreading tendency would not be prevented. From some points of view, the flange bottom 38 bears the same relation to the face 10 that the flange 20 bears to the face 12. If desired, the side 40, as illustrated in Fig. 6, may further be provided with a terminal flange portion or prongs 42, embedded in the surface 26, the better to hold the rubber 2 on the cup.

The rubber 2 may be contained entirely in the cup 4, 38, 40, as illustrated in Figs. 2, 5 and 6, or this cup may be contained entirely in the rubber. As illustrated in Figs. 3 and 4, the rubber is, in effect, contained entirely in the cup, a very small layer of the rubber lining the outside surface of the cup, largely for appearance sake, so that the cup-shaped member is embedded in the rubber 2.

Further modifications will also occur to persons skilled in the art and all such are considered to fall within the spirit and scope of the invention as defined in the appended claims.

What is claimed is:

1. A washer comprising a ring element constituted of relatively soft material, and an annular, cup-shaped member comprising a substantially flat bottom and two substantially cylindrical coaxial and parallel sleeve side parts, the cup-shaped member being constituted of relatively hard material, the cup-shaped member being embedded in the ring element.

2. A faucet comprising a rotatable faucet valve stem the free end of which is provided with a substantially flat circular face having a screw-threaded opening, a washer comprising a ring element of less than one inch diameter but slightly larger than the said substantially flat face of the faucet valve stem and constituted of relatively soft material, a metal reinforcing member comprising a cylinder and embedded in the ring element, the thickness of the washer being about one-third to two-thirds the said diameter, one of the faces of the washer being substantially flat and in engagement with the substantially flat face of the faucet valve stem, the opposite face of the washer having an exposed portion of the ring element for engaging a faucet valve seat, and a headed screw disposed in the opening of the cylinder and threaded in the screw-threaded opening, the washer being confined on the faucet valve stem between the said substantially flat face of the faucet valve stem and the head of the screw, and the metal of the cylinder being adapted to reinforce the relatively soft material to relieve it of the strain of the pressure exerted thereon by the screw.

3. A washer comprising a ring element constituted of relatively soft material having two oppositely disposed faces of different area, one of which is adapted to engage a valve seat and the other of which is adapted to engage a valve stem, a tapering surface between the faces, and an annular cup-shaped reinforcing member constituted of relatively hard material and having a bottom, an inner-sleeve part, and an outer-sleeve part of substantially less height than the height of the inner-sleeve part, the cup-shaped member being embedded in the ring element with the outer-sleeve part extending substantially to the valve-seat face of the ring element, the valve-seat face of the ring element being adapted to be engaged by the head of a screw or bolt adapted to be received in the opening of the washer and mounted on the valve stem to hold the washer in place, the inner-sleeve part constituting a reinforcing member for the relatively soft material to relieve it of the strain of the pressure exerted by said head of the screw or bolt, and the outer-sleeve part holding the relatively soft material securely against a tendency to curl or spread outward.

4. A washer comprising a ring element constituted of relatively soft material having two oppositely disposed faces of different area, one of which is adapted to engage a valve seat and the other of which is adapted to engage a valve stem, the ring element having a cylindrical wall adjacent to the larger face and a tapering surface connecting the cylindrical wall with the smaller face, and an annular cup-shaped reinforcing member constituted of relatively hard material and having a bottom, an inner-sleeve part, and an outer-sleeve part of substantially less height than the height of the inner-sleeve part and substantially the same as the height of the said cylindrical wall, the cup-shaped member being embedded in the ring element, the valve-seat face of the ring element being adapted to be engaged by the head of a screw or bolt adapted to be received in the opening of the washer and mounted on the valve stem to hold the washer in place, the inner-sleeve part constituting a reinforcing member for the relatively soft material to relieve it of the strain of the pressure exerted by said head of the screw or bolt, and the outer-sleeve part holding the relatively soft material securely against a tendency to curl or spread outward.

5. A faucet washer comprising an annular cup-shaped member of less than one inch diameter constituted of relatively hard material and having a bottom, an inner-sleeve part, and an outer-sleeve part of substantially less height than the height of the inner-sleeve part, and a ring element constituted of relatively soft material in which the cup-shaped member is embedded, the ring element being of thickness about one-third to two-thirds of the said diameter and substantially thicker than the height of the outer-sleeve part so that a portion of the ring element extends exposed substantially beyond the said outer-sleeve part, one of the faces of the washer being substantially flat for engagement with a substantially flat face of a faucet-valve stem, and the opposite face of the washer being provided upon the said extending portion of the ring element for engaging a faucet-valve seat, the inner sleeve part constituting a reinforcing member for the relatively soft material to relieve it of the strain of the pressure exerted upon the said opposite face of the washer, and the outer-sleeve part holding the relatively soft material securely against a tendency to curl or spread outward.

6. A faucet washer comprising a metal cup-shaped member of less than one inch diameter having a bottom, an inner-sleeve part, and an outer-sleeve part of substantially less height than the height of the inner-sleeve part, and a ring element constituted of rubber in which the cup-shaped member is embedded and vulcanized to the cup-shaped member throughout the area of contact between the ring element and the cup-shaped member, the ring element being of thickness about one-third to two-thirds of the said diameter substantially thicker than the height of the outer-sleeve part and substantially the same as the height of the outer-sleeve part so that a portion of the ring element extends exposed substantially beyond the said outer-sleeve part but not substantially beyond the inner-sleeve part, one of the faces of the washer being substantially flat for engagement with a substantially flat face of a faucet-valve stem, and the opposite face of the washer being provided upon the said extending exposed portion of the ring element for engaging a faucet-valve seat, the inner-sleeve part constituting a reinforcing member for the rubber to relieve it of the strain of the pressure exerted upon the said opposite face of the washer, and the outer-sleeve part holding the rubber securely against a tendency to curl or spread outward.

7. A faucet washer comprising an annular cup-shaped reinforcing member constituted of relatively hard material having a substantially flat bottom, an inner-sleeve part and an outer-sleeve part, the sleeve parts being substantially cylindrical, coaxial and parallel, and a ring element constituted of relatively soft material in which the cup-shaped member is embedded, the ring element having a substantially flat face substantially parallel to the flat bottom of the cup-shaped member and an exposed face opposite to the substantially flat face, the substantially flat face being adapted to engage a substantially flat face of a faucet-valve stem, and the said exposed face being adapted to engage a faucet-valve seat.

8. A faucet washer comprising a ring element of relatively soft material, and an annular, cup-shaped member comprising a bottom and inner and outer-sleeve side parts, the cup-shaped member being of relatively hard material and embedded in the ring element, and said inner-sleeve side part having its outer side surface flush with the wall of the opening in said ring element.

JACOB PODOLSKY.